UNITED STATES PATENT OFFICE.

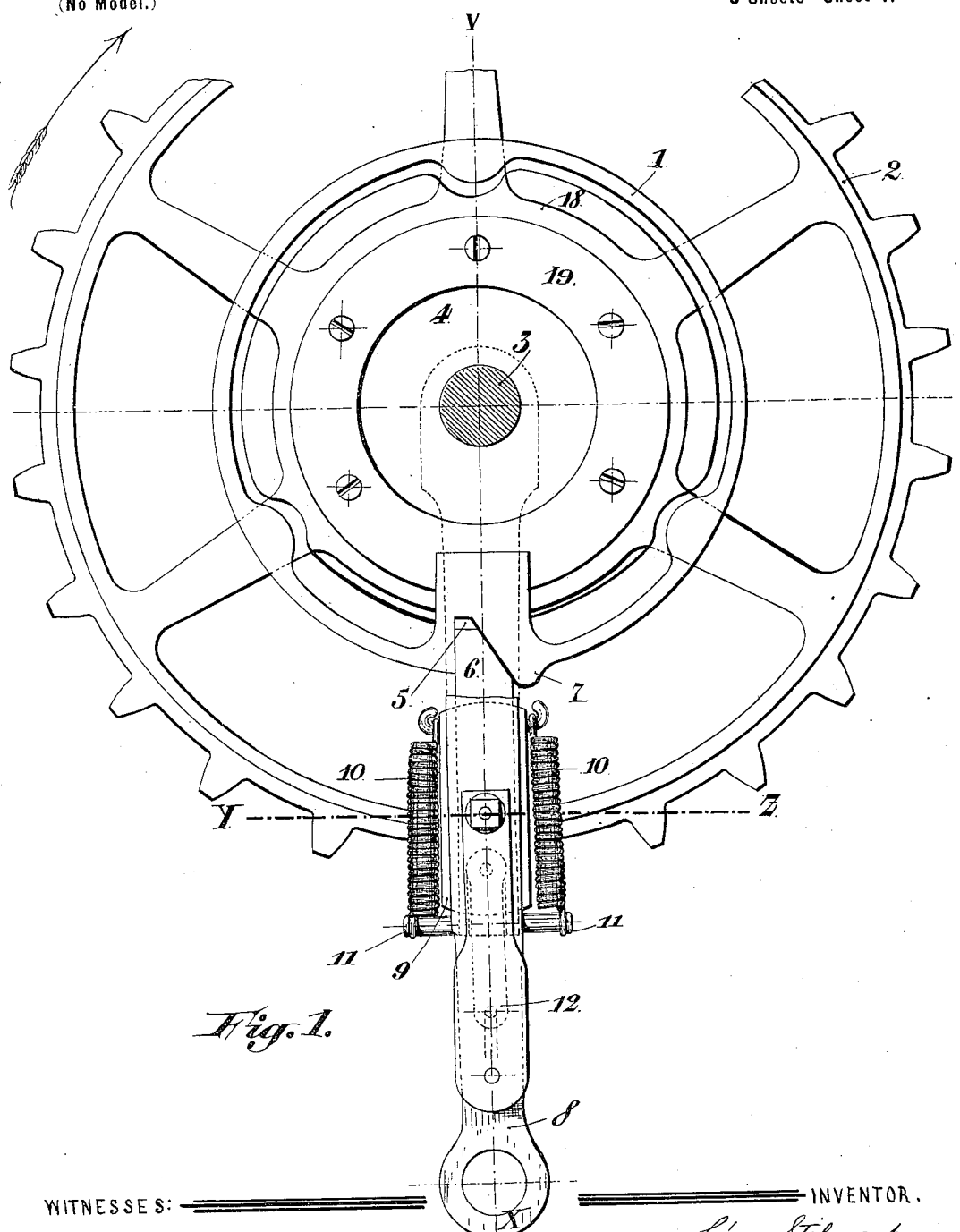

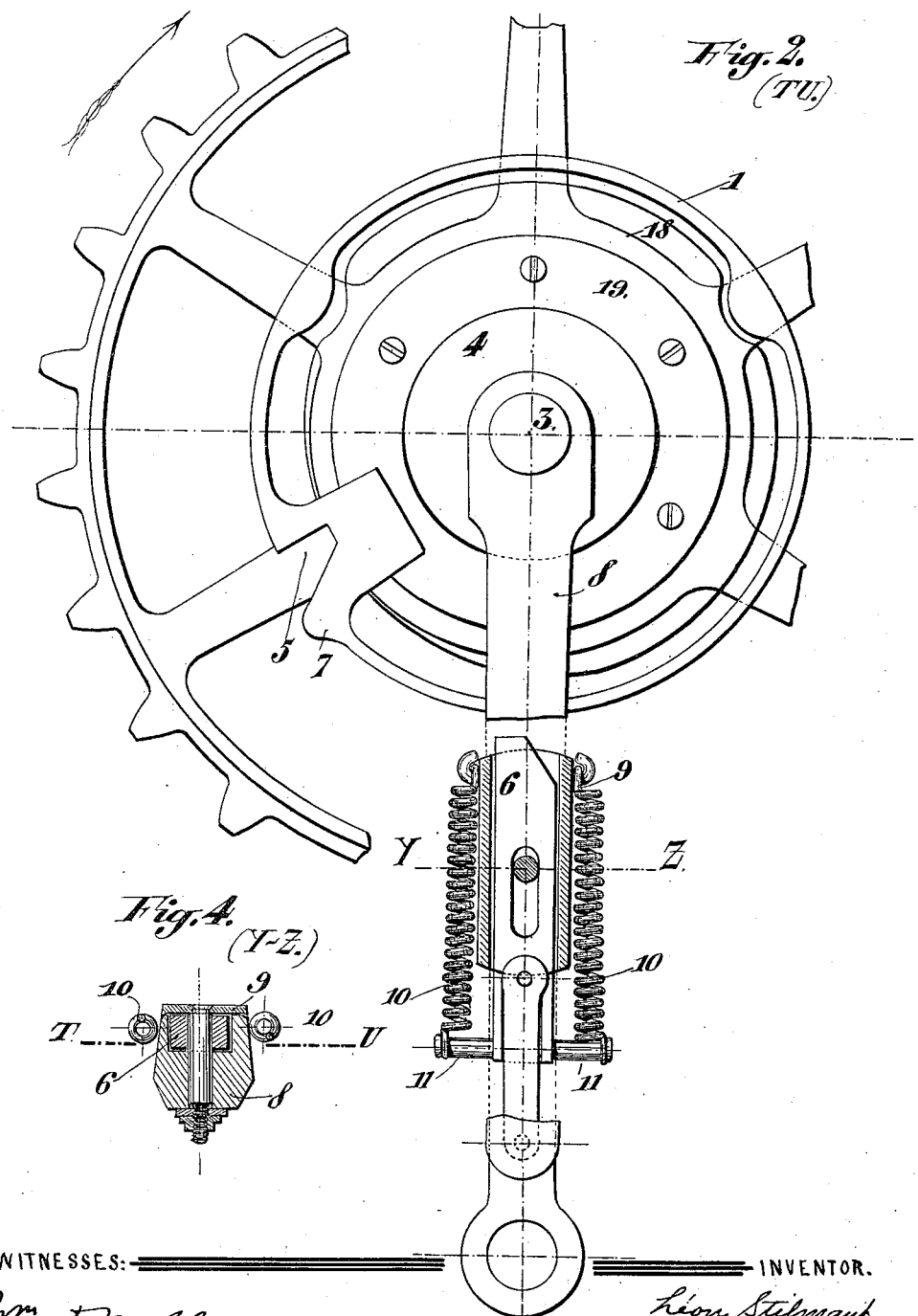

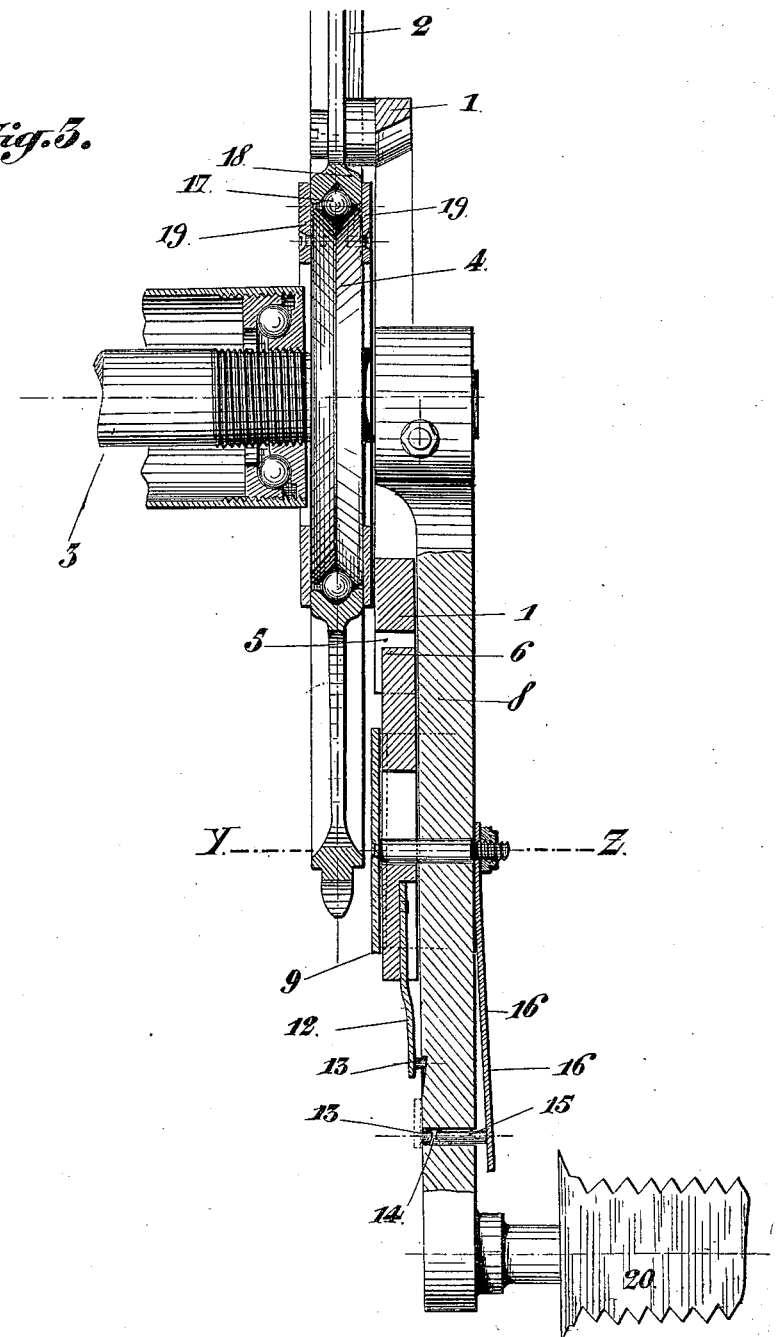

LÉON STILMANT, OF BRUSSELS, BELGIUM.

CHANGE-SPEED GEAR FOR CYCLES.

SPECIFICATION forming part of Letters Patent No. 659,713, dated October 16, 1900.

Application filed November 13, 1899. Serial No. 736,755. (No model.)

*To all whom it may concern:*

Be it known that I, LÉON STILMANT, a citizen of Belgium, residing at 8 Rue Jules Bouillon, Brussels, in the Kingdom of Belgium, have invented Improvements in Change-Speed Gear for Cycles, of which the following is a specification.

The present invention relates to change-speed gears for bicycles, tandems, tricycles, and the like, and has for its special objects, first, to change the speed of the machine at will during traveling, and, second, to allow the rider to keep his feet stationary on the pedals when the machine has acquired a desired speed. The whole of the device can be applied to any velocipede, whether driven by means of a chain or otherwise.

The device when applied to a cycle does not affect the symmetry of the machine. On the contrary, the lines become more symmetrical, especially in chainless cycles, in which the change of speed is preferably obtained by the difference of ratio between the gear-wheels of the rear driving-wheel of the machine.

The results claimed for this invention are obtained by doubling the parts transmitting the force, or, in other words, by providing the machine on both sides with similar means of transmission to those generally placed on the right side only, with the difference, however, that on one side there will be arranged a speed-gear higher than that of the other side. Besides this it is necessary that the toothed wheel of the high-speed gear should be loose on the pedal-axle, while the wheel actuating the low-speed device is fixed on the axle, as in ordinary cycles, and that, on the other hand, the pinion of the high-speed gear should be fixed on the hub of the driving-wheel of the machine, while the pinion of the low-speed gear is loose in the same hub in the direction opposite to the ordinary forward movement of the machine in such a manner that the driving-wheel cannot gear with the small speed-gear as long as its velocity is greater than that transmitted to the pinion of the low-speed gear by the corresponding actuating toothed wheel.

It follows from the preceding that to be able to travel at will by means of one or the other speed-gear, or to have the pedals inactive while the machine is moving forward owing to the momentum acquired, it is sufficient that the wheel of the high-speed gear should be so arranged as to be able to be connected to or disconnected from the corresponding crank whenever required. For this purpose the crank corresponding to the high-speed gear is provided with a movable latch on one of its sides, which can be engaged in or disengaged from a recess in a circular plate secured to the toothed wheel of the high-speed gear. The coupling of the latch, effected by a small lateral movement of the foot, and the uncoupling of the same, effected by the pressure of the feet on the pedals in a direction contrary to the movement of the cycle, produces the connection and disconnection, respectively, of the toothed wheel of the high-speed gear, which enables the rider to use either the high-speed gear or the low-speed gear or to stop the pedals from rotating, the hub of the driving-wheel being loose in the first and last case as regards the pinion of the low-speed gear.

In the accompanying drawings, Figure 1 represents in a front view the speed-gear-coupling device as applied to a machine driven by chain, the drawing showing the pinion in the coupled position. Fig. 2 represents the same, but in the uncoupled position. Fig. 3 is a longitudinal section on the line $v\,x$ of Fig. 1, and Fig. 4 is a cross-section of the crank on the line $y\,z$ of Figs. 1 and 3.

The coupling and uncoupling device represented in the drawings consists principally of a metallic part 1, curved and fixed to the arms or spokes of the toothed wheel 2 of the high-speed gear, which is independent of the pedal-axle 3. This part 1 is provided on its periphery with a recess 5, the front side of which as regards the direction of movement of the machine is approximately radial, while the other side is inclined and terminates outwardly with a projection 7, forming a kind of cam or eccentric on the periphery of the part 1. Into this recess 5 a latch 6 is adapted to enter, the point of which is so shaped as to fit the recess 5, the said latch being arranged on the inner side of the crank 8, where it is guided in its movement by a plate 9, attached to the crank in any suitable manner. The latch 6 is normally drawn toward the crank-axle 3 by two springs 10, fixed at one end to the crank and suitably connected at the other end to the latch, say, by means of a pin 11. The latch 6 is also provided with a flat spring 12, the end of which is provided with a pin 13, which when the latch is not locked keeps it in its unlocked position by entering a recess or hole 14 in the crank, as represented by the dotted lines in Figs. 2 and 3. This hole also receives another pin 15, fixed to the free end of another flat spring 16, fixed on the outer side of the crank, and which is intended to drive out the pin 13 from the hole for the purpose of effecting the coupling of the wheel.

In order to diminish the friction which otherwise would take place during the time the wheel is not keyed between the toothed wheel 2 and the crank-axle 3, these two parts are provided with ball-bearings comprising a disk 4, fixed on the axle 3 or made in one piece with it. The disk 4 is provided with a groove on which the inner rim 18 of the wheel 2 revolves. Any lateral displacement of the latter is prevented by the two side plates 19, which at the same time serve as dust-guards. Balls 17 are introduced into the recess of the disk 4 through a hole provided for that purpose in the crown 18 and closed afterward in any suitable manner. The toothed wheel 2 being uncoupled—i. e., the latch 6 occupying the position represented in Fig. 2—all the cyclist has to do to produce an engagement is to slightly move his foot laterally on the pedal at the moment when the latter occupies its lower dead-point in such a manner as to press against the spring 16, the pin 15 of which will then completely pass through the perforation 14 and press out the pin 13 of the spring 12, whereupon the latch will be free to follow the action of the springs 10, owing to which it will slide along the part 1 until it arrives at the recess 5, into which it will engage. From this moment the wheel 2 of the high-speed gear is coupled with the crank 8 and produces the corresponding movement in the machine.

In order to uncouple the wheel 2, the cyclist must press down the pedal, so as to render it immovable when it arrives at its lowest dead-point, while the wheel still moves forward owing to the momentum acquired by the machine. The consequence of it will be that the inclined face of the recess 5 will be forced over the latch 6—i. e., force it out of the recess and over the eccentric or cam 7. The object of the latter is to produce a sufficient downward displacement of the latch, so that the pin 13 may enter the hole 14 and that during the rotation of the wheel the latch should not be in frictional contact with the periphery of the part 1. (See Fig. 2.) The latch 6 being now free from the recess 5 the pedal will move independently of the wheel 2, and the cyclist may now go forward either by means of the low-speed gear or rest his feet on the stationary pedals and move along slowly owing to the momentum acquired by the machine.

Having thus fully described my invention, what I claim as new, and desire to secure by Letters Patent, is—

In a bicycle, the combination, with the main drive-shaft, of drive-wheels mounted thereon, the one loosely, cranks carried by said shaft and provided with pedals, a spring-controlled latch carried by one of said cranks, a disk secured to the loose wheel and having a peripheral recess adapted to be engaged by said latch to lock the crank and wheel together, said disk also having a peripheral projection adjoining the recess, a plate-spring carried by said latch, a pin carried by said plate-spring, an aperture penetrating said crank and adapted to receive said pin, another plate-spring carried by the crank, and another pin carried by said last-named plate-spring, projecting into said aperture and adapted to displace said first-named pin therefrom, substantially as described.

In testimony that I claim the foregoing I have hereto set my hand this 20th day of October, 1899.

LÉON STILMANT.

Witnesses:
J. P. H. POHLEY,
GREGORY PHELAN.